United States Patent [19]
Putze

[11] Patent Number: 6,058,885
[45] Date of Patent: May 9, 2000

[54] LOCK AND RELEASE MECHANISM FOR VERTICAL ADJUSTABLE DECK IN LIVESTOCK TRAILERS

[75] Inventor: Matthew M. Putze, Sioux City, Iowa

[73] Assignee: Wilson Trailer Company, Sioux City, Iowa

[21] Appl. No.: 09/000,943

[22] Filed: Dec. 30, 1997

[51] Int. Cl.[7] .................................................... B60P 3/04
[52] U.S. Cl. ............................................................ 119/407
[58] Field of Search .................................... 119/400, 401, 119/406, 407; 105/370; 296/24.1, 24.2

[56] References Cited

U.S. PATENT DOCUMENTS

| | | | |
|---|---|---|---|
| 375,764 | 1/1888 | Moran | 119/401 |
| 384,913 | 6/1888 | Jenkins | 119/401 |
| 777,732 | 12/1904 | Judson et al. | 119/402 |
| 1,558,224 | 10/1925 | Bentley | 119/401 |
| 1,563,470 | 12/1925 | Chisam | 119/407 |
| 1,591,033 | 7/1926 | Gawne | 119/401 |
| 1,774,140 | 8/1930 | Hertel, Jr. | 119/401 |
| 2,099,774 | 11/1937 | Spencer | 119/402 |
| 2,129,438 | 9/1938 | Nitsche | 296/10 |
| 2,529,893 | 11/1950 | Albert | 119/489 |
| 2,970,861 | 2/1961 | Short | 296/24.2 |
| 3,020,083 | 2/1962 | Doan et al. | 119/407 |
| 3,405,661 | 10/1968 | Erickson et al. | 105/371 |
| 3,633,963 | 1/1972 | Haynes | 296/24.2 |
| 3,774,577 | 11/1973 | Sanders | 119/455 |
| 3,812,822 | 5/1974 | Blankenship | 119/453 |
| 3,866,543 | 2/1975 | Richard | 105/370 |
| 3,940,174 | 2/1976 | Mayes | 296/3 |
| 4,119,042 | 10/1978 | Naves et al. | 105/370 |
| 5,791,726 | 8/1998 | Kaufman | 296/24.2 |

*Primary Examiner*—Robert P. Swiatek
*Assistant Examiner*—Elizabeth Shaw
*Attorney, Agent, or Firm*—Jacobson, Price, Holman & Stern, PLLC

[57] ABSTRACT

A lock and release mechanism for vertically elevatable decks in a livestock trailer including a plurality of vertical rows of vertically spaced, pivotally mounted, locking pins located at a plurality of longitudinally spaced locations along each side of the livestock trailer. Each of the locking pins is connected to an operating arm extending radially from the axis of the pivotal locking pins. An operating rod is pivotally connected with the arms at each location for movement of all of the locking pins from a locking position to a released out of the way position by an operator at ground level. The lock and release mechanism of this invention enables livestock or other cargo to be sequentially loaded on decks at trailer floor level and sequentially raised. The deck locking pins automatically pivot out of the path of deck supporting hooks during elevation of a deck and return to a position to support the deck hooks when a loaded deck is lowered. This invention also enables the elevated decks to be lowered from a transport position to trailer floor level for unloading by elevating the decks off the pins and releasing the locking pins from a position externally of the trailer by a ground level operator utilizing a vertically elongated operating rod and spring assembly associated with the locking pins.

21 Claims, 5 Drawing Sheets

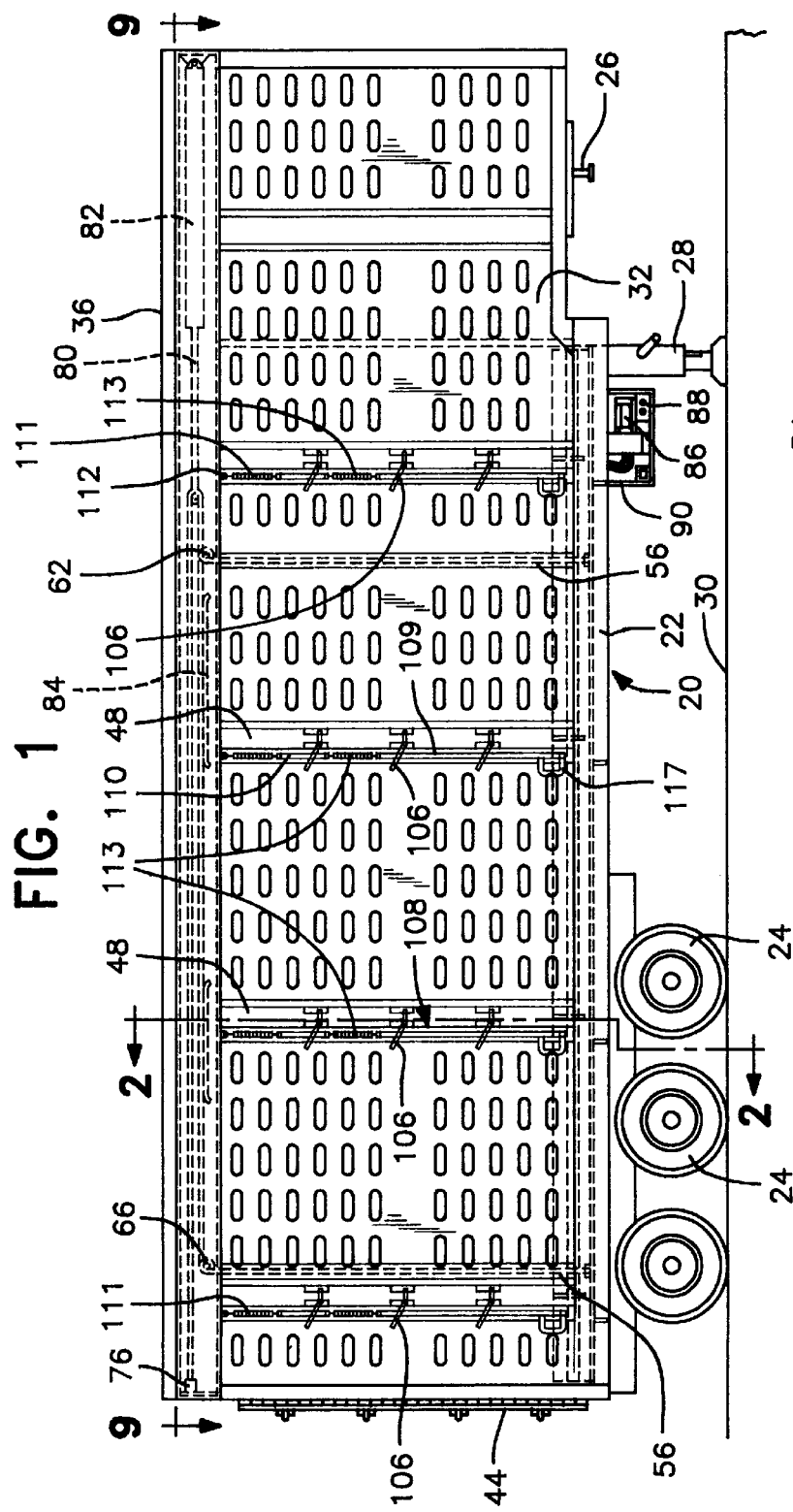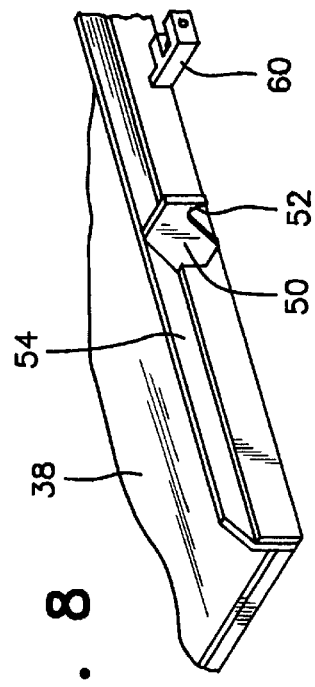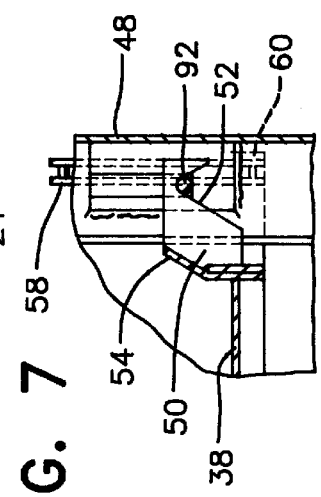

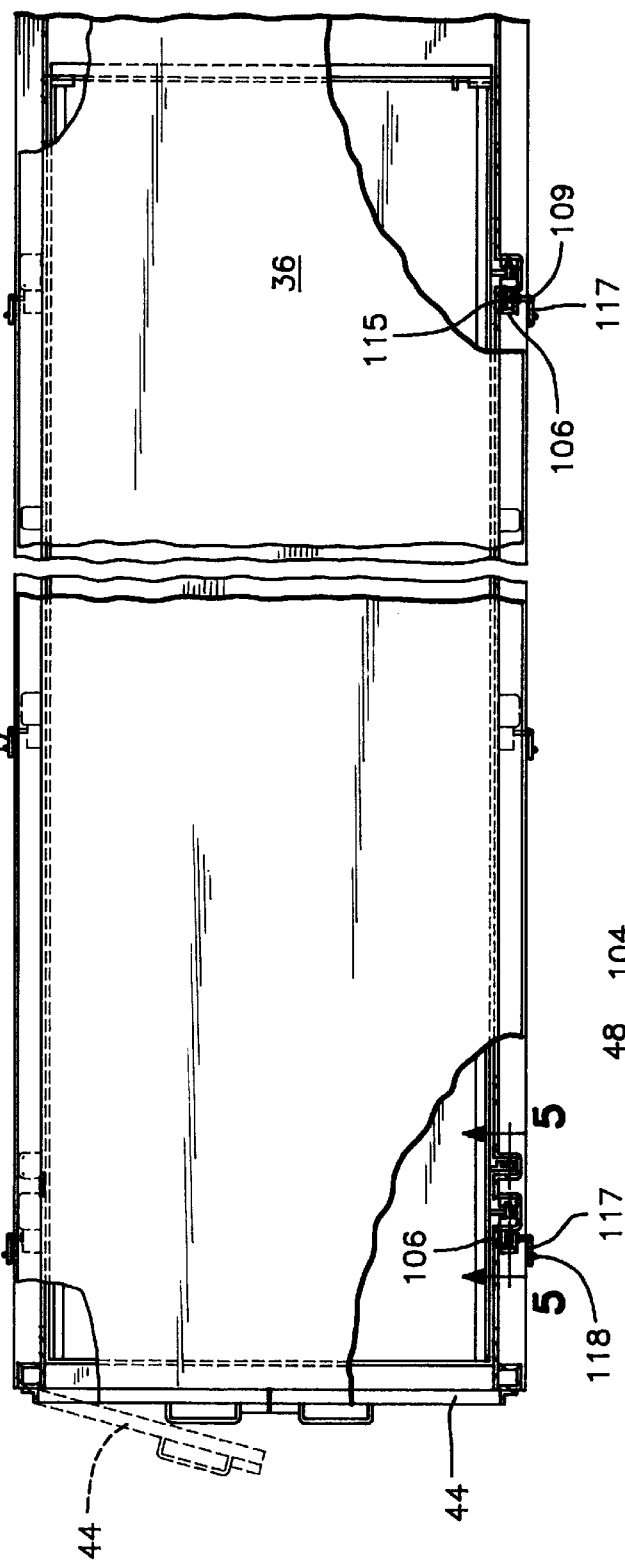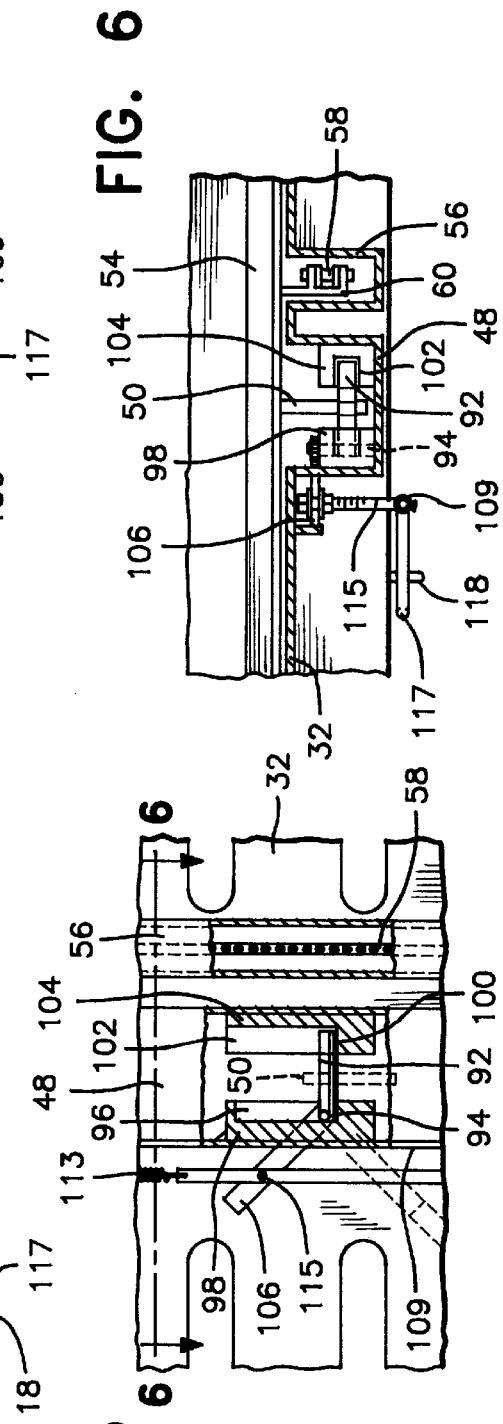

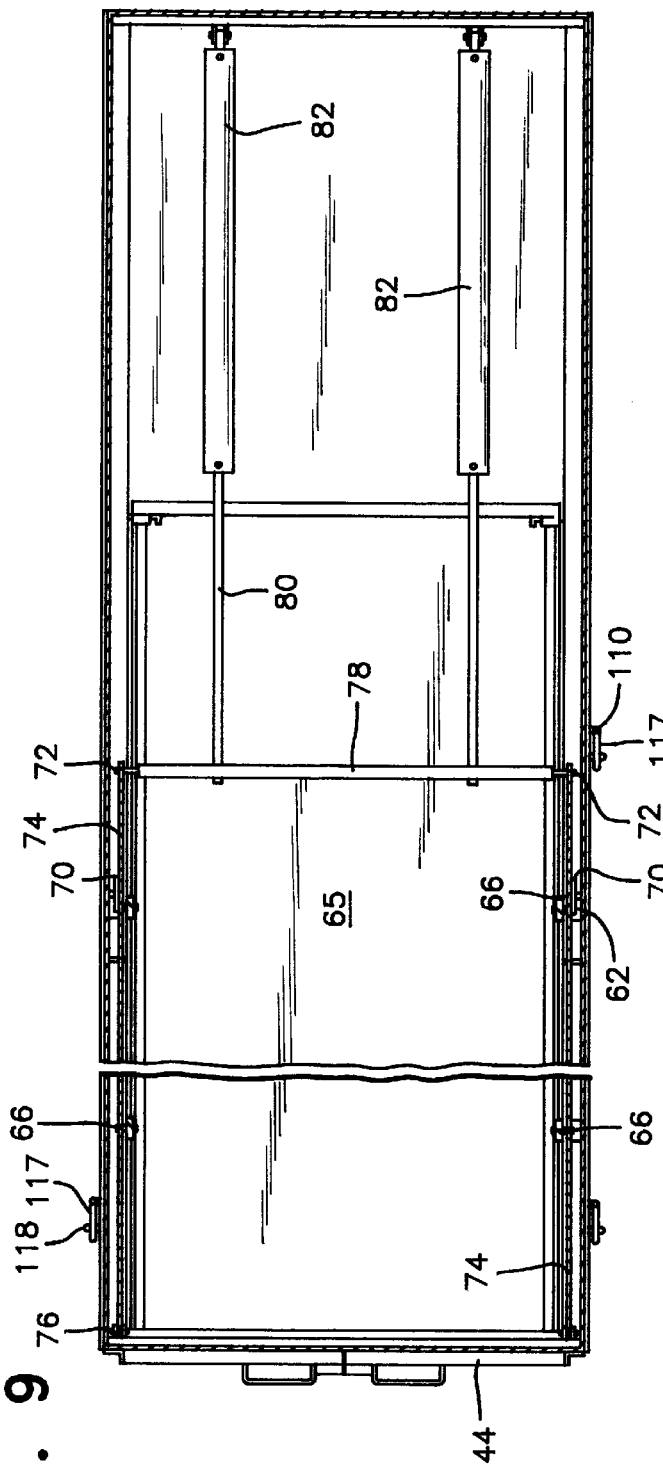
FIG. 9
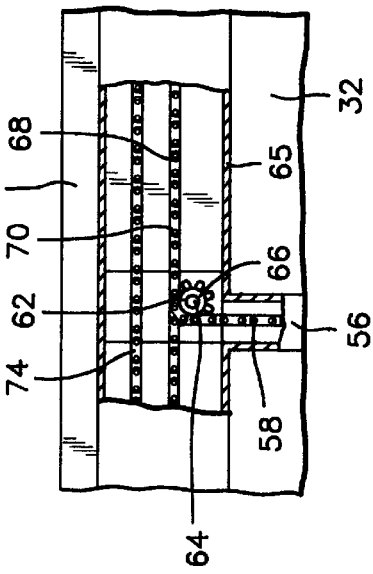
FIG. 12
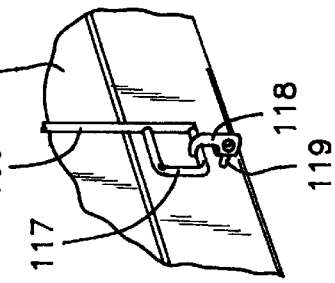
FIG. 11
FIG. 10

LOCK AND RELEASE MECHANISM FOR VERTICAL ADJUSTABLE DECK IN LIVESTOCK TRAILERS

BACKGROUND OF THE INVENTION

1. Field of the Invention

The present invention generally relates to improvements in livestock trailers having vertically adjustable decks and more specifically includes a lock and release mechanism for the vertically adjustable decks which enables an operator to automatically lock vertically adjustable decks in their vertically elevated position and to effectively release the locking mechanism, all from a position on the ground exteriorly of the trailer.

2. Description of the Prior Art

Livestock trailers with multiple, vertically spaced decks are well known when it is desired to transport livestock having a relatively short vertical height. The decks are normally fixed permanently in position which requires elongated ramps to move the livestock onto the elevated decks. Alternatively, the decks are vertically adjustable and oriented at trailer floor level when loaded and moved to and locked in an elevated transport position. More specifically in movable deck trailers, the livestock or other cargo is placed on an uppermost deck at trailer floor level. The loaded deck is then elevated to a transport position and is locked in place by manually inserting locking pins, bolts or the like. The next highest vertically adjustable deck is then loaded with livestock or other cargo and elevated and locked in place. This procedure is repeated for each movable deck until the trailer is fully loaded.

Usually, each trailer deck is supported at a plurality of longitudinally spaced points along each side of the trailer by removably inserting locking pins or bolts which requires an operator to obtain access to the vertically elevated points for manually manipulating the locking pins or bolts. Vertical access to the locking pins is usually accomplished by an operator climbing onto the side walls of the trailer at a plurality of locations to accomplish secure locking of the trailer decks in their transport position and subsequently releasing the trailer decks when unloading livestock or cargo in order for the trailer decks to be lowered. The locking and releasing operation is quite time consuming and subjects the operator to the possibility of injury when manually manipulating the locking pins or bolts and when climbing the side wall of the trailer. The danger of injury with these prior art systems is especially evident when considering that the loading and unloading of livestock is usually done outdoors in areas having supporting surfaces with various materials which can become attached to the shoes of an operator which introduces the possibility of injury to the operator especially during inclement weather.

The following patents relate generally to this field of endeavor:

| | | |
|---|---|---|
| 375,764 | 1,774,140 | 3,405,661 |
| 384,913 | 2,099,774 | 3,633,963 |
| 777,732 | 2,129,438 | 3,774,577 |
| 1,558,224 | 2,529,893 | 3,812,822 |
| 1,591,033 | 2,970,861 | 3,940,174 |

The prior art requires the operator to manually place pins or bolts through the side wall of the trailer at each deck position while climbing up the side wall of the trailer to lock the adjustable decks into place and subsequentially release them which subjects the operator to the risk of slipping or falling from the trailer side.

SUMMARY OF THE INVENTION

The lock and release mechanism of this invention facilitates the loading and unloading of multiple vertically adjustable trailer decks with livestock or other cargo. More specifically, the instant lock and release mechanism includes a pivotal locking pin arrangement mounted on the side walls of the trailer that will automatically lock the deck or decks in elevated transport position and will enable the locking pins to be released by the operator at ground level when lowering the decks to trailer floor level. This enables the trailer decks to be sequentially locked automatically in an elevated transport position in a quick and easy operation and to be sequentially released from ground level to quickly enable the trailer decks to be lowered from an elevated transport position to trailer floor level position. This system therefore allows the operator to lock and unlock elevated decks of a livestock trailer, or the like, without having to scale the side walls of the trailer.

The lock and release mechanism of the present invention includes a plurality of vertical rows of vertically spaced, pivotally mounted, locking pins located at a plurality of longitudinally spaced locations along each side of the livestock trailer. Each of the locking pins is designed to receive and support a deck supporting hook mounted on the side of the vertically adjustable trailer deck. An operating arm extends radially from the pivot axis of each pivotal locking pin, and an operating rod and spring assembly is associated with the arms. The operating rod and spring assembly acts to spring bias the locking pins to a locking position and to enable manual movement of the locking pins from a locking deck supporting position to a released out of the way position when the vertically adjustable decks have been lifted off of the locking pins a sufficient distance to enable them to pivot to the released position.

The lock and release mechanism of this invention enables the livestock or other cargo to be loaded onto one, two or more decks at trailer floor level. The decks are then raised with the spring biased deck locking pins automatically pivoting out of the path of the deck supporting hooks as the hooks engage and pivot the pins upwardly as the upper deck passes upwardly past the pins. The pins engage and support the upper deck hooks when the decks are then lowered thereby securing the upper deck in a secure manner in a vertically elevated transport position. The arrangement of the operating arms and operating rod and spring assemblies allows the deck or decks below the upper deck in the transport position to be returned to floor level for loading additional livestock or other cargo. The lower deck or decks can then be sequentially elevated and locked in a similar manner at a spaced location or locations below the upper deck.

This invention also enables the decks to be sequentially lowered from a transport position to trailer floor level for unloading the livestock or other cargo also from a position externally of the trailer by an operator. The lowermost deck is first elevated off of the locking pins for that deck and all locking pins below that deck are released to an out of the way position by the operator manipulating the elongated rod and spring assembly associated with the operating arms connected to each locking pin. The locking pins supporting any higher deck remain in supporting position. The lowermost deck can then be lowered to the trailer floor for unloading. After unloading, the lowermost deck can be raised to lift the next lowermost deck off its locking pins, and the sequence is repeated until all of the vertically adjustable decks have been sequentially lowered to the trailer floor level and unloaded. The rod and spring assemblies are preferably provided with a handle accessible to the operator standing on the ground surface alongside the trailer.

When the trailer is outfitted with preferably two vertically adjustable decks, the release mechanism includes a sectional rod having a short upper segment and a longer lower segment. The upper segment is pivoted to the operating arm on an uppermost pin and includes a tension upper spring between the upper end of the upper segment and an upper portion of the trailer. The lower segment of the rod is pivotally connected to the operating arms of the lower pins, and a tension spring stronger than the upper spring connects the rods segments. This configuration allows the lower deck to be returned to trailer floor level by moving the lower rod segments downwardly which moves the lower locking pins to a released out of the way position. The lower deck can then be loaded and moved to a vertically elevated transport position below the upper deck.

When unloading, the lower deck is elevated off the lowermost locking pins and the lower segment of the sectional rod is moved downwardly by stretching the lower spring thereby releasing the lowermost locking pins to enable the lower deck to be lowered to floor level for unloading. The lower deck is then elevated to engage and lift the upper deck from the uppermost locking pins. This movement enables the stronger lower spring to move the upper segment of the rod downwardly by overcoming the tension of the weaker upper spring thereby moving the uppermost locking pins to their released position. The upper deck can then be lowered to floor level for unloading.

Therefore, it is an object of the present invention to provide a lock and release mechanism for vertically adjustable decks in a livestock trailer which eliminates the use of manually installed pins or bolts, as well as the hazardous conditions encountered when an operator climbs along the side wall of a livestock trailer in order to insert and remove the locking pins or bolts.

It is a further object of the present invention to provide a lock and release mechanism for vertically adjustable decks in a livestock trailer which enables a substantial time saving in the loading and positioning of the vertically adjustable decks and in the returning of the decks to the trailer floor level for unloading.

It is another object of the present invention to provide a lock and release mechanism which includes a plurality of locking pins oriented in a vertical row in vertically spaced relation at a plurality of locations spaced longitudinally along each side of a livestock trailer with the locking pins being movable to enable the outwardly extending supporting hooks on the vertically adjustable decks to sequentially pass beyond the pins with the pins then being automatically moved into locking position to support the trailer deck hooks when the decks are lowered into engagement with the pins thereby automatically locking the vertically adjustable decks in vertically elevated transport position.

A further object of the present invention is to provide a lock and release mechanism in accordance with the preceding object in which the locking pins are pivotally mounted for pivotal movement to a locking position extending across a guide channel for the deck supporting hooks with the locking pins being spring biased into locking position to enable pivotal movement of all or certain of the locking pins in one location by the use of an elongated operating rod and spring assembly connected to the pins in a unique manner. The operating rod and spring assembly preferably has a handle at a lower end thereof to enable the operator to grasp the handle and move the locking pins in that location to a released out of the way position by overcoming the spring bias on the pins which are below any pins supporting a deck when the vertically adjustable decks are lifted sequentially off of the locking pins a sufficient distance to enable the locking pins to swing out of the path of movement of the deck hooks.

A still further object of the present invention is to provide a lock and release mechanism for vertically adjustable decks as described in the preceding objects in which each of the locking pins includes an operating arm extending radially from the pivot axis of each locking pin. Each operating arm is rigid with respect to its associated locking pin and preferably extends in a direction generally opposite from the locking pin in relation to the pivot axis. The operating rod and spring assembly is then associated with each of the arms for pivotal movement of each of the locking pins by an operator grasping the handle at the lower end of the operating rod and pulling it downwardly thereby enabling the locking pins to be released and moved to an out of the way position by an operator standing on the ground surface. The operating rod and spring assembly preferably engages a hook or latch in the downward position.

Still another object of the present invention is to provide a lock and release mechanism for vertically adjustable decks in a livestock trailer as described in the preceding objects which enables effective loading of livestock or other cargo onto vertically adjustable decks at trailer floor level. The vertically spaced locking pins automatically pivot out of the path of the deck hooks and then pivot to a locked position for engagement with and supporting the deck hooks on an upper deck when it is lowered thereby securing the upper deck in a vertically elevated transport position.

A still further object of the invention is to provide a livestock trailer having upper and lower vertically elevated decks with a lock and release mechanism by which the upper and lower decks can be supported in vertically spaced relation above the floor of the trailer to divide the interior of the trailer into three generally equal height spaces. Alternatively, the upper deck rests on the lower deck and both decks are elevated to a generally central position to divide the interior of the trailer into two generally equal height spaces. The lock and release mechanism as well as the elevating and lowering mechanism for the decks is capable of being operated from ground level thereby eliminating an operator climbing the side walls of the trailer to manually insert and remove lock pins or bolts.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS OF THE PREFERRED EMBODIMENT

FIG. 1 is a side elevational view of a livestock trailer illustrating the preferred embodiment of a lock and release mechanism of the present invention oriented at a plurality of longitudinally spaced locations along the side wall of the trailer.

FIG. 3 is a top plan view of the trailer of FIG. 1 with portions broken away illustrating structural details of the preferred locking and release mechanism, the side wall structure of the trailer and the structure of a deck.

FIG. 5 is a fragmental sectional view taken along section line 5—5 on FIG. 3, on an enlarged scale, illustrating the structure of the uppermost locking pin and the associated operating rod, upper tension spring, locking pin arm and related trailer side wall structure of the preferred embodiment of the present invention.

FIG. 6 is a plan section view, taken along section line 6—6 on FIG. 5, illustrating further structural details of the preferred lock and release mechanism and associated trailer structure.

FIG. 7 is a fragmental sectional view illustrating the association of the vertically adjustable deck hook and the locking pin of the preferred embodiment.

FIG. 8 is a perspective view of one side edge of a lower vertically adjustable deck illustrating the supporting hook and lifting bracket in accordance with the present invention.

FIG. 9 is a plan sectional view, on an enlarged scale with portions broken away, taken along section line 9—9 on FIG. 1, illustrating the structure for lifting and lowering the vertically elevatable decks.

FIG. 10 is a fragmental perspective view illustrating a latch structure for holding the operating rod in a locking pin released position in accordance with the present invention.

FIG. 11 is a fragmental sectional view illustrating further structural details of the rod latch structure in accordance with the present invention.

FIG. 12 is a fragmental sectional view illustrating the lifting chain structure for the decks in accordance with the present invention.

DESCRIPTION OF THE PREFERRED EMBODIMENT

Figure 2:
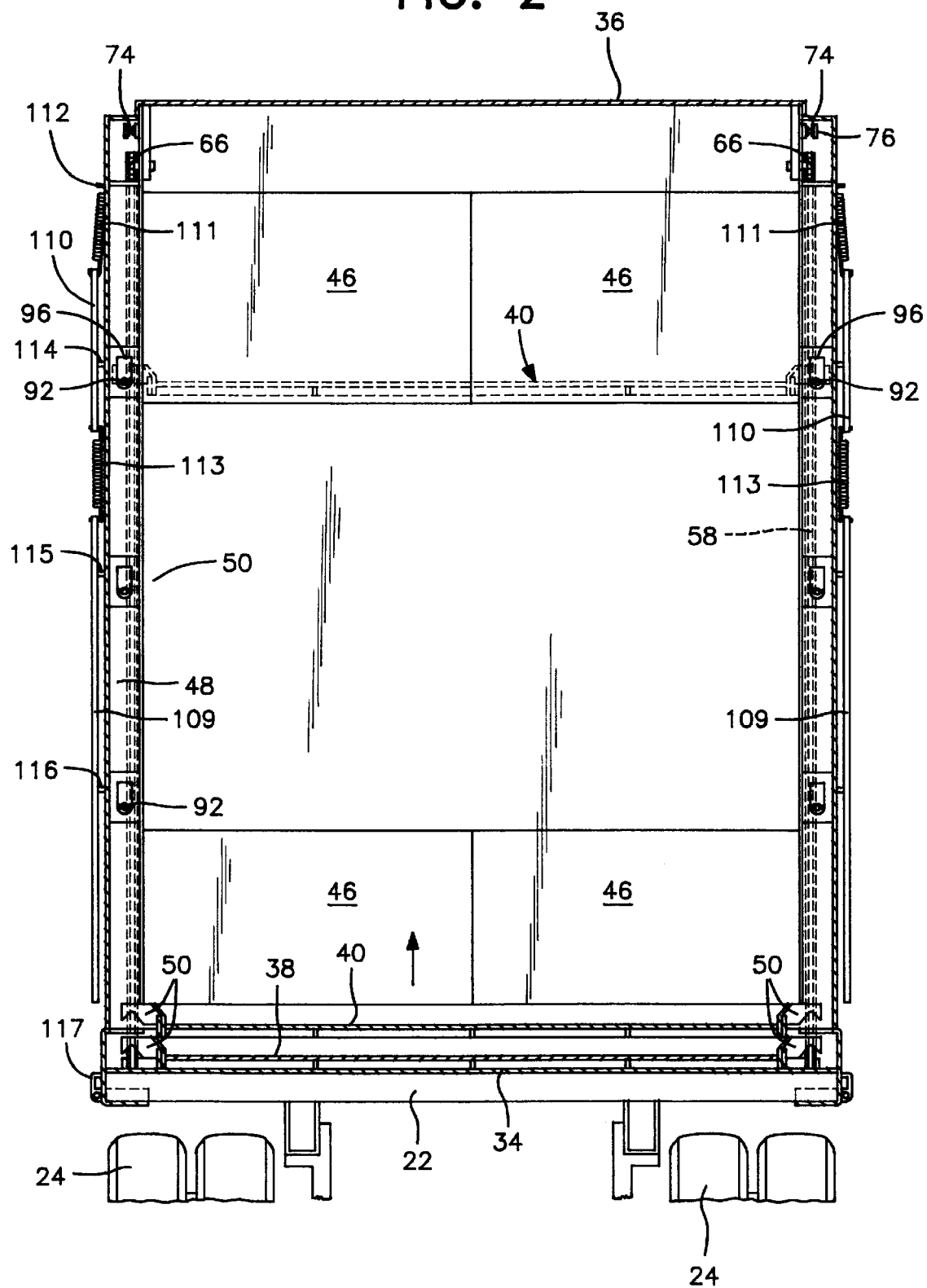
FIG. 2 is a transverse, sectional view, on an enlarged scale, taken along section line 2—2 on FIG. 1 illustrating two vertically adjustable decks with the upper deck shown in a vertically elevated transport position.

In describing the preferred embodiment of the present invention as illustrated in the drawings, specific terminology will be resorted to for the sake of clarity. However, the invention is not intended to be limited to the specific embodiment illustrated and terms so selected; it being understood that each specific term includes all technical equivalents which operate in a similar manner to accomplish a similar purpose.

Referring now specifically to the drawings, FIG. 1 illustrates a livestock trailer 20 incorporating usual frame structure 22 supported by tandem wheels 24 at the rear and a depending pin 26 at the front for connection to the fifth wheel of a tractor unit (not shown). The trailer is illustrated detached from the tractor unit and supported by the usually provided support members or landing gear 28 which can be manually lowered into engagement with a supporting surface 30. This portion of the livestock trailer is conventional as is the slotted or apertured side walls 32. The trailer 20 also includes a trailer floor 34 and roof structure 36 and two vertically adjustable decks 38 and 40. The adjustable decks are vertically movable from a position adjacent the trailer floor 34 to an elevated transport position. As illustrated in FIG. 2, the upper deck 40, shown in broken line, has been elevated to an upper position. The lower deck 38 can be elevated to a lower position to divide the inside of the trailer into three generally equal height spaces or compartments for transporting livestock of short height, such as hogs. Alternatively, both decks can be simultaneously elevated while in contact with each other and be supported in a central position to divide the inside of the trailer into two generally equal height compartments for transporting taller livestock, such as cows. The number of vertically adjustable trailer decks may be varied depending upon the type and size of livestock or other cargo to be transported and the vertical height of the trailer.

The loading procedure involves the lowering of both decks to the trailer floor position with the upper deck 40 then being loaded through access doors 44 at the rear of the trailer 20 with use of a horizontal ramp (not shown) in a conventional and well known manner. By using the vertically elevatable decks, the usual provision of stationary vertically spaced decks along with inclined chutes or ramps extending at a sharp angle to the plurality of vertically spaced stationary decks can be eliminated. The use of the plurality of vertically elevatable decks enables the decks to be loaded when they are at trailer floor position and then elevated to a transport position. Each deck also includes a foldable or collapsible gate or transverse wall 46 to compartmentalize the space above each deck when in its vertically elevated transport position in a manner well known in this art.

Each side wall of the trailer 20 includes vertical frame or rail members 48 at longitudinally spaced locations with the frame or rail members generally being of channel configuration with the open side of the channel facing inwardly as illustrated in FIG. 6. The decks 38 and 40 each include a series of outwardly extending support hooks 50 at longitudinally spaced locations along each of the side edges of the deck with each hook including a downwardly opening notch 52. The hooks 50 are positioned to extend into the channel-shaped frame members 48 and are guided by frame members 48 for vertical movement therein, as illustrated in FIGS. 5 and 6. Further, as illustrated in FIG. 8, each side edge of the adjustable decks 38 and 40 includes an outwardly and upwardly inclined flange 54 having an upper edge terminating closely adjacent the side walls 32 of the trailer. This close proximity precludes livestock from having access to the space between the side edges of the decks and the side walls 32 of the trailer 20. Also, each side wall 32 includes at least two vertical channel-shaped frame members 56, preferably adjacent certain of the frame members 48 such as the forwardmost and rearmost frame members, to receive a lift chain 58 connected at its lower end to bracket 60 attached to each side edge of the lowermost deck 38.

Each lift chain 58 extends vertically in frame member 56 and has its upper end entrained over a sprocket 62 supported on a shaft 64 (see FIG. 12) positioned above a top wall 65 generally parallel to and vertically spaced below the roof 36 to form a longitudinal compartment above the floor 34 and the vertically elevatable decks. The forwardmost sprocket 62, or all of the sprockets except for the last one if more than two lift chains are employed on each side, is a double sprocket with the inner sprocket 66 supporting a movable chain 68 to which each lift chain 58 is attached as at 70 so that as the movable chain 68 moves toward the front of the trailer (to the right in FIGS. 1 and 9), it will pull lift chains 58 over the sprockets 62 to lift the lowermost deck 38. The rearmost lift chain 58 is a continuation of movable chain 68 and is engaged with a single sprocket 66 aligned with the other inner sprockets 66 in order for chain 68 to extend downwardly as a lift chain 58.

A movable chain 68 is provided at each side of the trailer 20 above the top wall 65, and each movable chain 68 is preferably entrained over a movable sprocket 72 located toward the front of the trailer. The movable chain 68 then preferably extends rearwardly as a stationary chain 74 above the movable chain 68 as illustrated in FIGS. 1 and 12, extending to the rear of the trailer where it is anchored to the trailer as at 76, as shown in FIGS. 1 and 9. Thus, as the movable sprockets 72 are moved longitudinally, the movable chain 68 and thus the lift chains 58 are moved a distance that is twice the distance of movement of the movable sprockets 72. The movable sprockets 72 are preferably connected by a cross member 78 to which the sprockets 72 are journaled. The cross member 78 then is preferably connected to a pair of piston rods 80 extending from a pair of longitudinally extending hydraulic cylinders 82. By extending and retracting the piston rods 80, the cross bar 78 and thus movable sprockets 72 will move longitudinally, causing lift chains 58 to raise and lower decks 38 and 40.

Rather than the sprockets 72 being interconnected by a transverse member 78, the piston rods and cylinders may be moved to the outer corners of the trailer and connected directly to the movable sprockets 72. Alternatively, a single piston and cylinder arrangement may be connected to the cross member 78 or a flexible bridle structure may interconnect the movable sprockets 72 which will be slidably guided with the center of the bridle being connected to a single piston and cylinder assembly along the center line of the trailer. The portions of the movable chain 68 between the forward sprocket 62 and the rearmost sprocket 66 may be supported by slider supports 84, as shown in FIG. 1. Also, the stationary chain 74 may be provided with similar supports to retain it in spaced relation to the movable chain 68. The hydraulic cylinders are powered by a suitable hydraulic pump and electric motor assembly, such as assembly 86 provided with controls 88 positioned in a convenient location, such as preferably below frame 22 in a housing 90 adjacent the forward end of the trailer, so as to enable an operator to readily lift and lower the decks.

When loading the trailer with both decks lowered to a position adjacent the trailer floor 34, the upper deck 40 is loaded with livestock or other cargo and both decks are elevated by retracting piston rods 80. During such elevation, the deck supporting hooks 50 will engage horizontally disposed, longitudinally extending locking pins 92. The pins 92 have one end rigidly mounted on a pivot pin 94 journaled in a cavity 96 in a mounting block 98 mounted on a wall of the channel-shaped frame 48, as by welding or the like. The free outer end of the pin 92 is supported on a horizontal ledge 100 formed in a vertical cavity 102 in a supporting block 104 mounted in opposed spaced relation to the block 98. The block 104 is rigidly affixed to the opposite wall of the channel-shaped frame 48, also as by welding or the like, as illustrated in FIGS. 5 and 6. In this supported or locking position, the pin 92 can engage the downwardly facing notch 52 in the hook 50 as illustrated in FIG. 7 thereby supporting the elevated deck in a horizontal position on the frame members or support rails 48. However, when the decks move upwardly, the top edge of the hooks 50 will engage the bottom surface of the pins 92 thus pivoting them upwardly into cavity 96 to enable the hooks 50 to pass upwardly beyond the pins 92 after which the pins 92 are biased to return to their horizontal position to support the hooks 50.

Figure 4:
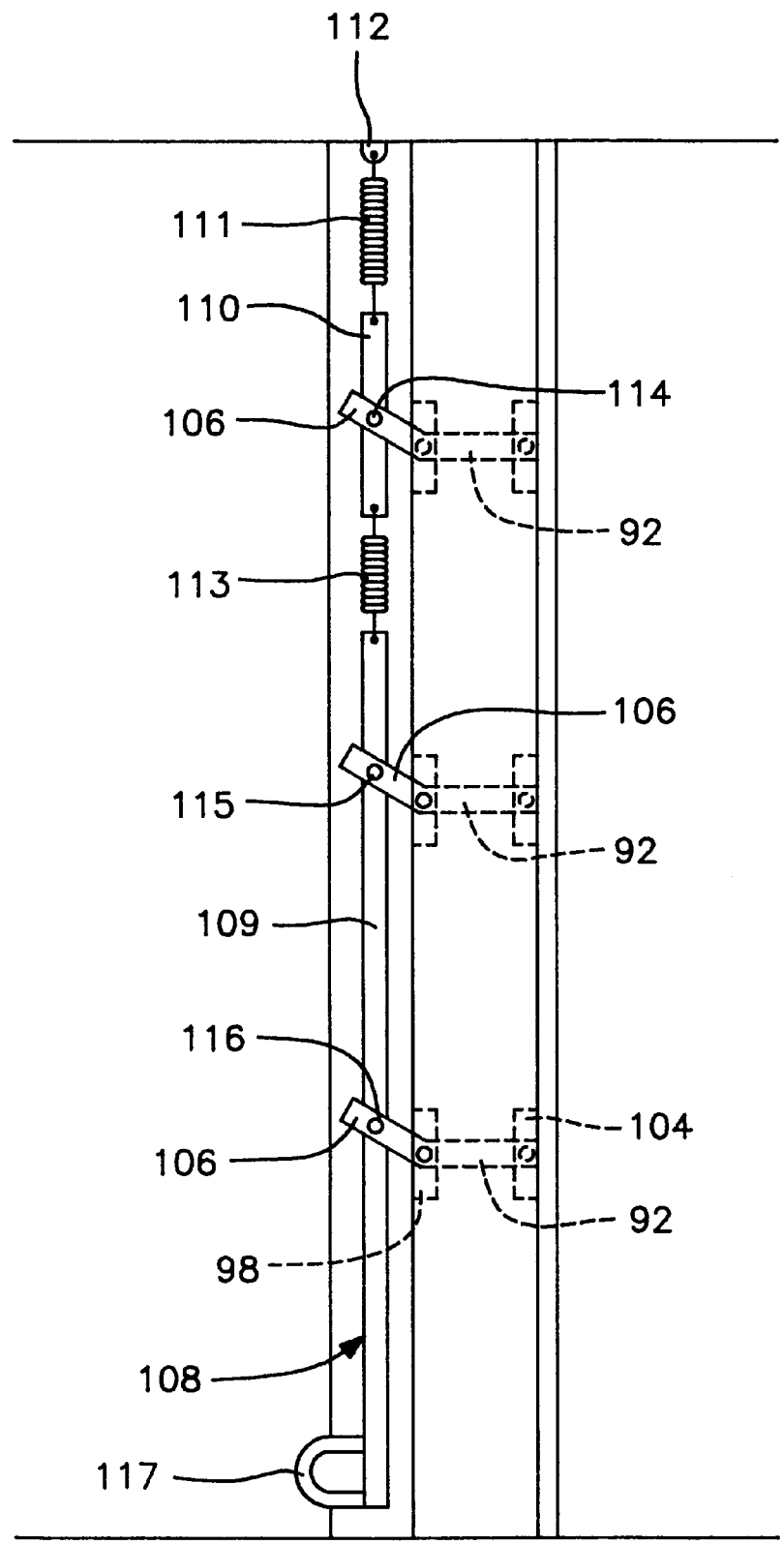
FIG. 4 is a fragmental side elevational view of the preferred lock and release mechanism of the present invention illustrating the association of the segmental locking rod and tension springs to the locking pins and arms.

Each locking pin 92 includes an operating arm 106 rigid with the pivot pin 94 which extends radially from the pivot pin 94 in a direction generally opposite to the locking pin 92. By this arrangement, arcuate movement of arm 106 will cause pivotal movement of pivot pin 94 and corresponding arcuate movement of the locking pin 92 from a locking position against supporting ledge 100, as shown in FIG. 5, to a released vertical out of the way position within the cavity 96. An elongated, vertically disposed segmental operating rod and spring assembly, generally designated by the numeral 108, extends alongside the operating arms 106, as shown in FIG. 4. Each segmental operating rod and spring assembly 108 includes a lower rod segment 109 and an upper rod segment 110 with the upper rod segment being aligned with and shorter than the lower rod segment and spaced about 8 inches above the lower rod segment. A tension coil spring 111 is connected to the upper end of the upper rod segment 110, extends upwardly therefrom and is connected to an upper portion of the trailer side wall or frame, or top wall 65, as at 112. The rod segments 109 and 110 are interconnected by a lower tension coil spring 113 which bridges the space between the rod segments. The upper coil tension spring 111 is sufficiently strong to move the entire operating rod and spring assembly 108 upwardly but is weaker than the lower tension coil spring 113.

The upper rod segment 110 is pivotally connected to arm 106 on the uppermost locking pin 92 by a pivot pin 114. The lower rod segment 109 is connected to the central locking pin 92 by pivot pin 115 and to the lowermost locking pin 92 by pivot pin 116, as shown in FIG. 4. This structure enables all of the pivotal locking pins to be spring biased to a horizontal locking position, as shown in FIG. 7. This also enables all the locking pins 92 to be moved to a vertical released position out of the way of the supporting hooks 50 when the rod segments 109 and 110 are moved downwardly and enables the central and lowermost locking pins 92 to be moved to a vertical position when the uppermost locking pin is held in horizontal position by supporting engagement with a hook 50 on the elevated upper deck 40. The lower end of the lower rod segment 109 is preferably provided with a loop-type handle 117 which is oriented at an elevation to enable an operator standing on the ground to readily grasp the handle to pull the rod segments 109 and 110 downwardly against the bias of weaker coil spring 111. The loop handle 117 is designed to engage with a hook type latch 118, such as shown in FIGS. 10 and 11. The latch 118 is rigid with a lateral rod 119 received in a hollow tube 120 on frame 22. A compression spring 121 on rod 119 biases the latch 118 into latching engagement with the handle 117 to hold the rod and spring assembly 108 in a lowered position so that arms 106, pivot pins 94 and locking pins 92 are rotated (counterclockwise as shown in FIG. 4) against biasing springs 111 and 113. In this position, the pins 92 are retained in their vertical released out of the way position within cavities 96.

With all of the decks positioned at trailer floor level and the operating rod and spring assembly 108 in an elevated position sustained by spring 111, all of the locking pins 92 will be in a horizontal position supported by the pivot pin 94 and the ledge 100, as illustrated in FIG. 4. The upper deck 40 is then loaded and both decks are moved upwardly by retracting the piston rods 80 to move the lift chains 58 simultaneously upwardly. As the decks move upwardly, the upper edges of the hooks 50 will lift the locking pins 92 to pivot them to an upwardly extending position to enable the hooks 50 to pass upwardly beyond the pins 92. When the upper deck 40 reaches a position with the hooks 50 thereon oriented slightly above the upper end of the uppermost locking pins 92, all of the locking pins 92 will pivot to their locking position under the bias of springs 111 and 113 so that the free end of each pin is engaged and supported by ledge 100. Both decks can then be lowered a slight distance until the hooks 50 of the upper deck 40 engage the uppermost locking pins 92 but the hooks 50 on the lower deck 38 miss the uppermost locking pins because they are spaced below the uppermost locking pins 92. The lower deck 38 is thus free to be lowered. Further, in this position the lower deck 38 is spaced above the next lower locking pins 92 a sufficient distance to enable the next lower locking pins to be pivoted to their vertical released position when the upper deck 40 is supported at its elevated position. Then, by moving the handle 117 and lower rod segment 109 downwardly, the lower spring 113 will be tensioned and elongated which pivots the lower arms 106, pivot pins 94 and locking pins 92 counter-clockwise to move lower pins 92 to their vertical released position. Lower rod segment 109 can be secured in its lowered position by engaging latch 118 in handle 117. With this construction, all of the pins 92 below the uppermost pins, which are engaged by the hooks 50 on the upper deck 40, can be retracted to their released position. Thus, the lower deck 38 can be returned to the trailer floor position for loading.

Once the lower deck 38 has been lowered, the operating handle 117 and lower rod segment 109 can be returned to their elevated positions, thus returning the lower pins to their horizontal supporting position. After the lower deck 38 is loaded, it is elevated until the hooks 50 on the loaded lower deck pass the lowermost set of locking pins by engaging the locking pins and moving them to a released position until the hooks 50 on the loaded lower deck pass upwardly to a position above the lowermost set of locking pins. At this time, the locking pins will automatically return to their locking position under the force of spring 113. The loaded lower deck 38 is then lowered until the hooks 50 on loaded lower deck engage the lowermost set of locking pins 92 in order to support the lower deck on the vertical frame members or rails 48.

When unloading decks 38 and 40, the lower deck 38 is lifted off the lowermost set of pins 92 a sufficient distance to enable the pins 92 to pivot to their vertical released position. The handle 117 and lower rod segment 109 are pulled downwardly by stretching spring 113 thereby pivoting all of the pins 92 pivoted to lower rod segment 109 to a vertical released position. The handle 117 is latched in its downwardly displaced position and the lower deck 38 is lowered to trailer floor level and unloaded. The handle 117 is released and the lower deck 38 is elevated until it engages and lifts the upper deck 40 and hooks 50 off the uppermost set of pins 92 a distance sufficient to let the uppermost set of pins 92 to move to a vertical released position. During the vertical movement of the lower deck past the lowermost and central set of pins, the hooks 50 will lift the pins as the hooks pass upwardly. The lowermost and central set of pins 92 will return to their horizontal position as soon as the hooks pass due to the spring bias of spring 113. After the lower deck 38 has lifted the upper deck 40 off the uppermost set of pins 92, the handle 117, lower rod segment 109, spring 113 and upper rod segment 110 are pulled downwardly by handle 117 which stretches the upper weaker spring 111 thereby moving all of the arms 106 downwardly and pivoting all of the pins 92 to a vertical released position. The handle 117 is again latched in its lowered position and the decks 38 and 40 are lowered to trailer floor level and the upper deck 40 is unloaded. The handle 117 is then released and rod segments 109 and 110, the spring 113 and pins 92 return to the position shown in FIG. 4 by spring 111. Alternatively, the handle 117 may remain in latched lowered position when the lower deck 38 has been lowered so that it is only necessary to elevate the lower deck 38 after it has been unloaded until it engages and lifts the upper deck 40 which permits pins 92 to pivot to released position due to the bias of spring 113 overcoming the bias of spring 111.

As illustrated in FIG. 4, the three sets of pins 92 are generally spaced so that when the decks 38 and 40 are supported on the lowermost and uppermost sets of pins, each of the three compartments formed by the trailer floor 34 and decks 38 and 40 is approximately ⅓ the height of the trailer. This enables livestock that is relatively short in height, such as hogs, to occupy each of the compartments by being supported on the trailer floor 34 and the decks 38 and 40.

When livestock that are relatively tall in height, such as cattle, are to be transported, the livestock can be loaded onto the upper deck 40 when both decks are in their lowered position adjacent the floor 34 of the trailer. Both decks 38 and 40 are elevated with handle 117 released until both decks pass upwardly to a position just above the central set of pins 92. As the hooks 50 engage the pins 92, the pins 92 will pivot upwardly to permit passage of the hooks 50 and immediately return to horizontal locking position due to bias of spring 111. After both decks have been elevated above the central set of pins, the decks may be lowered so that the lower deck 38 is supported from the central pins 92 and the upper deck 40 rests on the lower deck. This arrangement divides the trailer into two compartments each of which is generally ½ the height of the trailer so that taller livestock may occupy the upper deck 40 and the trailer floor 34.

To unload the trailer when livestock or cargo occupy the trailer floor 34 and the upper deck 40 supported by the lower deck 38 and central set of pins 92, the trailer floor 34 is unloaded first. Then the lower deck 38 is moved upwardly which also lifts upper deck 40 to a position so that the central pins 92 can pivot upwardly to a vertical released position. The handle 117 is lowered and latched in its lowered position. Lowering of handle 117 moves rod segments 109 and 110, spring 113 and arms 106 downwardly stretching spring 111 thereby moving all of the pins 92 to vertical released positions. The lower deck 38 and upper deck 40 supported thereon can then be lowered to trailer floor level for unloading the livestock or cargo therefrom. The handle 117 is released and all of the pins 92 return to their horizontal position in readiness to repeat the loading process.

Various other arrangements of vertically movable decks and locking pins can be employed with the structure of this invention which enables the vertically elevatable trailer decks to be loaded at trailer floor level and elevated to a desired elevation. More specifically, the locking function of the decks in their elevated position and their subsequent deck releasing function and lowering of the elevatable decks is totally controlled by an operator at ground level. Accordingly, the present invention eliminates hazardous conditions encountered by operators climbing up the trailer side walls, using an external ladder or entering the interior of the trailer to insert or secure locking pins or bolts below vertically elevatable decks for locking the decks in a vertically elevated transport position, and subsequentially removing the locking pins or bolts to enable the decks to be moved to trailer floor level.

Further, the operation of the operating rod and spring assembly, the automatic locking of the decks in elevated positions and sequential loading, elevation and locking of the decks and sequential unloading of the decks by releasing the pins and lowering to trailer floor level for unloading, greatly reduces the time required to load and unload a multi-deck livestock trailer. In addition, this invention which facilitates loading of multiple vertically spaced decks at trailer floor level is advantageous in transporting hogs which have been bred to produce relatively high lean meat product. Such hogs are known as "stress positive" and in many instances subjecting such hogs to negative stress such as climbing long or steep inclined ramps, which is usually accompanied by prodding, shouting and general confusion, will produce harmful effects on their meat product such as discolorization.

The foregoing is considered as illustrative only of the principles of the invention since numerous modifications and changes will readily occur to those skilled in the art. For example, the present invention could be adapted for more than two elevatable decks, if desired. Further, other mechanism for moving the locking pins to their vertical released position and for rasing and lowering the vertically moving decks could be adopted without departing from the principals of the present invention. Therefore, it is not desired to limit the invention to the exact construction and operation shown and described, and, accordingly, all suitable modifications and equivalents may be resorted to, falling within the scope of the invention.

What is claimed as new is as follows:

1. A lock and release mechanism for vertically elevatable decks in a vehicle body in which the vehicle body includes a floor and a pair of generally parallel side walls extending upwardly from the side edges of the floor and at least one vertically movable deck movable from a position adjacent the floor of the vehicle body to an elevated transport position spaced above and generally parallel to the floor, said lock and release mechanism comprising a plurality of vertical frame members extending upwardly adjacent said side walls of the vehicle body and providing a plurality of vertically continuous guides therein, said movable deck including a plurality of supporting projections extending into the guides for vertical movement therein, at least one movable locking pin mounted on each frame member at a predetermined vertical elevation above the floor, said locking pins extending generally horizontally across the guide in a supporting position for supporting the projections on the movable deck, said locking pins being movable to a position enabling upward movement of the projections when the deck is moving upwardly past the locking pins and automatically returning back to said deck supporting position after the projections have passed upwardly in order to support the deck when the deck is lowered to engage the projections with the locking pins, and pin operating structure connected to said locking pins and extending to a position for access by an operator standing on ground surface to move the locking pins to a position enabling downward movement of the projections past the locking pins when the deck and projections are lifted off the locking pins to enable the elevated deck to be lowered to a position adjacent the vehicle body floor.

2. The lock and release mechanism as defined in claim 1 wherein each of said projections on the vertically movable decks includes a laterally outwardly extending hook having a downwardly opening notch for receiving and being supported by one said locking pin.

3. The lock and release mechanism as defined in claim 1 wherein a plurality of vertically elevatable decks are positioned in the vehicle body and each frame member includes a plurality of vertically spaced locking pins to enable passage of vertically elevatable decks upwardly in relation to the locking pins and then lowered into supporting engagement with the locking pins, an upper elevatable deck to be loaded at floor level is elevatable with all of the decks elevated to a position with the upper deck above the uppermost locking pins to support the upper deck while a lower vertically elevatable deck is returned to floor level of the vehicle body for sequential loading and elevation, said locking pins supporting a plurality of loaded decks sequentially locked automatically in vertically elevated transport position.

4. The lock and release mechanism as defined in claim 3 wherein each of said locking pins is pivotally supported for movement between a generally horizontal position and generally vertical position and a laterally extending arm extends radially from the pivot axis of the lock pin, said pin operating structure being associated with each of said arms for moving all of said locking pins to said generally vertical position to enable all of the locking pins to be moved to a deck releasing position, said pin operating structure extending vertically and terminating in a handle accessible to an operator at ground level to enable release of all lock pins at ground level.

5. The lock and release mechanism as defined in claim 4 wherein said pin operating structure includes resilient structure to enable all of the decks to be elevated with an upper loaded deck that is moved from the trailer floor position to an elevated transport position being locked into position automatically by the uppermost locking pins and a lower deck permitted to return to the floor position for loading and subsequent elevating to and locking in a transport position.

6. The lock and release mechanism as defined in claim 1 wherein said frame member at each location includes a mounting block supporting each locking pin for pivotal movement at one end thereof, said mounting block including a cavity receiving the locking pin when in retracted, generally vertical position to enable upward passage of the supporting projections.

7. The lock and release mechanism as defined in claim 6 wherein each frame member includes a supporting block opposed to the mounting block, said supporting block including a recess extending downwardly from an upper edge to define an upwardly facing shoulder engaging and supporting the swingable end of the locking pin to support the locking pin, projections, elevatable deck and load from said blocks and frame member at each location along the side walls of the vehicle body.

8. The lock and release mechanism as defined in claim 1 wherein said vehicle body is a livestock trailer having a plurality of vertically elevatable decks for movement between a floor level for loading and unloading and an elevated transport position, said trailer including rear access doors to enable loading at floor level thereby eliminating the necessity of using elongated, sharply inclined ramps to load livestock to a permanently mounted deck oriented substantially above the floor level of the trailer body.

9. The lock and release mechanism as defined in claim 1 wherein said locking pins are moved to a position out of the path of movement of the supporting projections of said movable deck by engagement with an upper surface of said projections.

10. In combination, a vehicle load body having a floor and side walls, at least one vertically movable deck, and a lock and release mechanism for said vertically movable deck comprising a plurality of vertical frame members extending upwardly from the vehicle body, each frame member including an inwardly facing, vertically disposed guide, said movable deck including a plurality of supporting projections extending into the guides for guided vertical movement therein, a locking pin mounted in each frame member at a predetermined vertical elevation above the floor, said locking pins extendable across the guide in a supporting position for supporting the projections on the movable deck, said locking pins being movable between an out of the way position to enable the projections to pass in said guides beyond said locking pin and said supporting position to support an elevated deck when positioned to engage the projections with the locking pins, and operating means connected to each of said locking pins and extending to a position for access by an operator standing at ground level to manually move the locking pins to said out of the way position when the elevated deck and projections are lifted a sufficient distance to enable the locking pins to move to said out of the way position thereby enabling the elevated deck to be lowered to a position adjacent the vehicle body floor to facilitate loading and unloading of cargo onto the vertically movable deck.

11. The combination as defined in claim 10 wherein each of said projections on the vertically movable deck includes a laterally outwardly extending hook having a downwardly opening notch for receiving and being supported by a locking pin.

12. The combination as defined in claim 10 wherein said locking pins extend horizontally across the guide when in said supporting position and are pivotable between said out of the way position and said horizontal supporting position.

13. The combination as defined in claim 12 wherein each of said locking pins includes a laterally extending arm extending radially from the pivot axis of the lock pin, said operating means including an operating rod pivotally connected with each of said arms for moving all of said locking pins to a retracted position to enable all of the locking pins to be moved to a deck releasing position, said locking rod extending vertically and terminating in a handle accessible from ground surface to enable release of all locking pins from ground surface.

14. The combination as defined in claim 13 wherein resilient means is operatively associated with said operating rod to enable the deck to be elevated to an elevated transport position and locked into position automatically by the locking pins.

15. The combination as defined in claim 14 wherein said frame member at each location includes a mounting block supporting each locking pin for pivotal movement at one end thereof with the mounting block including a cavity receiving the locking pin when in retracted, generally vertically inclined position to enable upward passage of the supporting hooks on the deck.

16. The combination as defined in claim 15 wherein each frame member includes a supporting block opposed to the mounting block, said supporting block including a recess extending downwardly from an upper edge to define an upwardly facing ledge engaging and supporting the swingable end of the locking pins to support the locking pins, projections and elevatable deck from said blocks and frame member at each location along the side walls of the vehicle body.

17. The combination as defined in claim 10 wherein said vehicle load body is a livestock trailer and includes a deck lifting and lowering mechanism to move said vertically movable deck between a lowered position adjacent said floor for loading and unloading and an elevated transport position.

18. The combination as defined in claim 17 wherein said trailer includes rear access doors to enable loading of said vertically movable deck at said lowered position adjacent floor level thereby eliminating the necessity of using elongated, sharply inclined chutes to load livestock to a permanently mounted deck oriented substantially above the floor of the trailer body.

19. A vehicle load body having a generally horizontal floor and generally vertical, parallel side walls, a pair of vertically movably decks, movable between a loading and unloading position adjacent floor level and an elevated transport position, a deck lifting and lowering mechanism associated with said decks and a lock and release mechanism for said vertically movably decks comprising a plurality of vertically spaced movable deck supporting pins mounted on each side wall at a plurality of longitudinally spaced locations, said pins being movable between a deck supporting position for supporting the movable decks and a second position enabling vertical movement of said decks past the pins, said pins being moved from said deck supporting position to said second position when engaged by an upwardly moving deck to enable the decks to pass upwardly above the locking pins, said locking pins automatically returning to said deck supporting position after the upwardly moving deck passes the pins thereby supporting the upwardly moving deck when the upwardly moving deck is lowered to engage and be supported by the locking pins in their deck supporting position, and operating means connected to said locking pins to move said locking pins to said second position when the supported deck is moved upwardly off the locking pins thereby enabling the supported deck to be lowered past the locking pins to a position adjacent the vehicle body floor to facilitate loading and unloading of cargo on the vertically movable decks.

20. The vehicle load body as defined in claim 19 wherein said operating means includes a vertical rod connected to said locking pins for moving all of said locking pins to said second position when said locking pins are not supporting a deck, said rod terminating in a handle accessible from ground level to enable movement of all locking pins that are not supporting a deck to said second position from said ground level.

21. The combination as defined in claim 20 wherein said vehicle load body is a livestock trailer, said vertically movable decks are movable between a lowered position adjacent said floor for loading and unloading and an elevated transport position, said trailer includes rear access doors to enable loading and unloading of livestock on the vertically movable decks at a lowered position adjacent floor level and support of the decks in elevated transport positions thereby eliminating the necessity of using elongated, sharply inclined ramps to load livestock to a permanently mounted deck oriented substantially above the floor of the trailer body.

* * * * *